United States Patent [19]

Jones

[11] Patent Number: 4,532,891
[45] Date of Patent: Aug. 6, 1985

[54] PET FEEDER ASSEMBLY

[76] Inventor: Richard O. Jones, 1306 Frontera, Millbrae, Calif. 94030

[21] Appl. No.: 579,705

[22] Filed: Feb. 13, 1984

Related U.S. Application Data

[63] Continuation-in-part of Ser. No. 538,164, Oct. 3, 1983, abandoned.

[51] Int. Cl.³ ............................................. A01K 5/00
[52] U.S. Cl. ................................ 119/51 FS; 119/51.5; 119/61
[58] Field of Search .................. 119/51 FS, 61, 72, 74, 119/51.5

[56] References Cited

U.S. PATENT DOCUMENTS

| | | | |
|---|---|---|---|
| 2,213,153 | 8/1940 | Warfel | 119/61 |
| 2,491,014 | 12/1949 | Parker | 119/72 |
| 2,586,979 | 2/1952 | Myers | 119/72 |
| 2,845,896 | 8/1958 | Copeland | 119/61 X |

Primary Examiner—Hugh R. Chamblee
Attorney, Agent, or Firm—Paul L. Hickman

[57] ABSTRACT

A pet feeder assembly characterized by a substantially rectangular pan, a lattice member engaged with the sidewalls of the pan, and a pair of feeding bowls engaged with apertures provided through the lattice member. The lattice member has interstices large enough to permit kibble and other large size particulate matter to fall into the collection pan.

6 Claims, 6 Drawing Figures

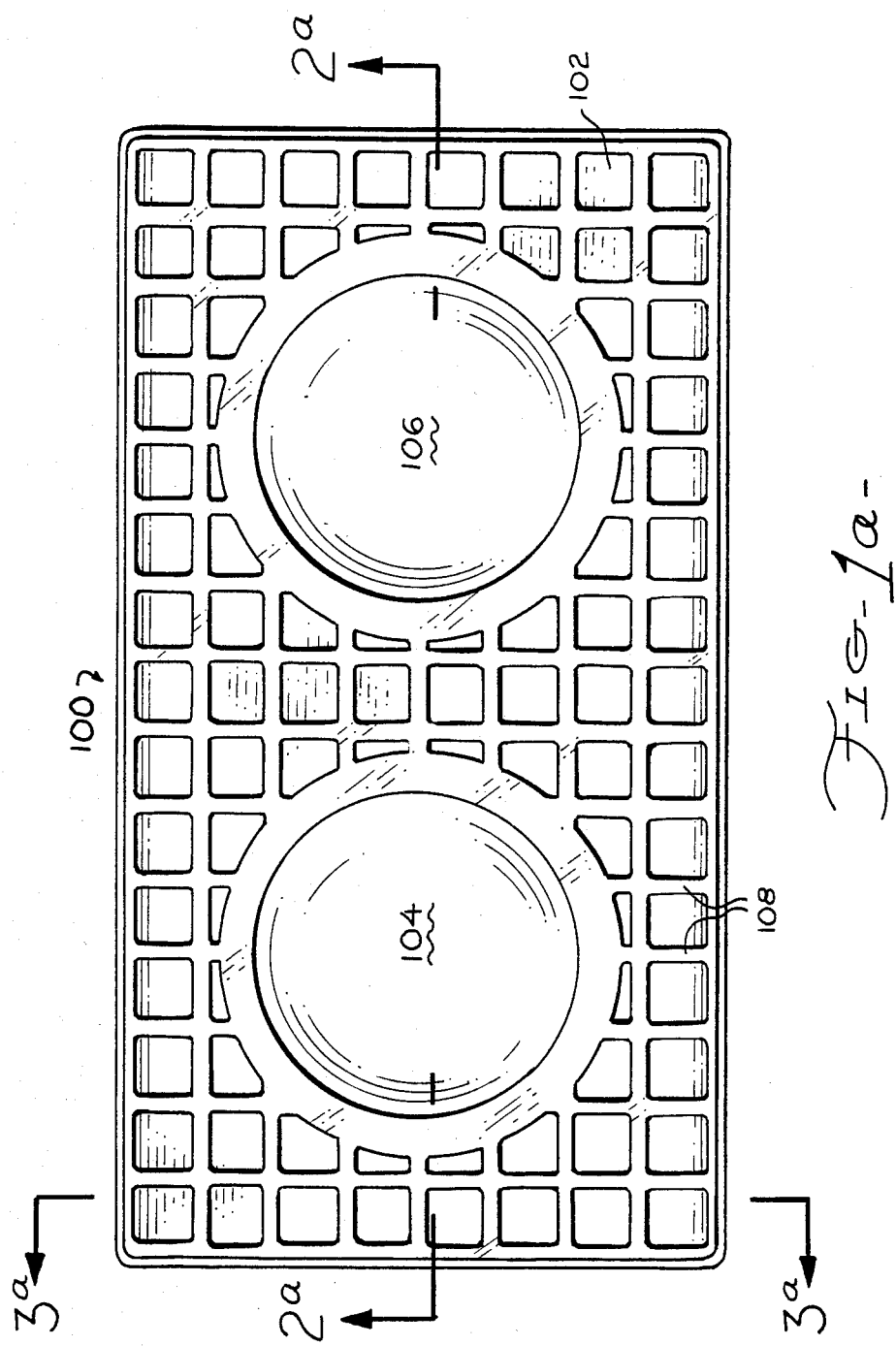

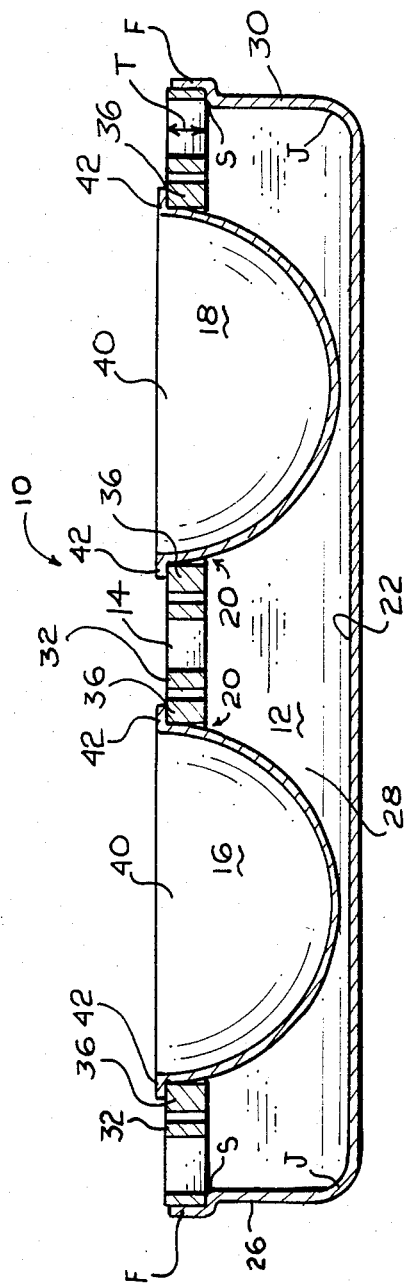
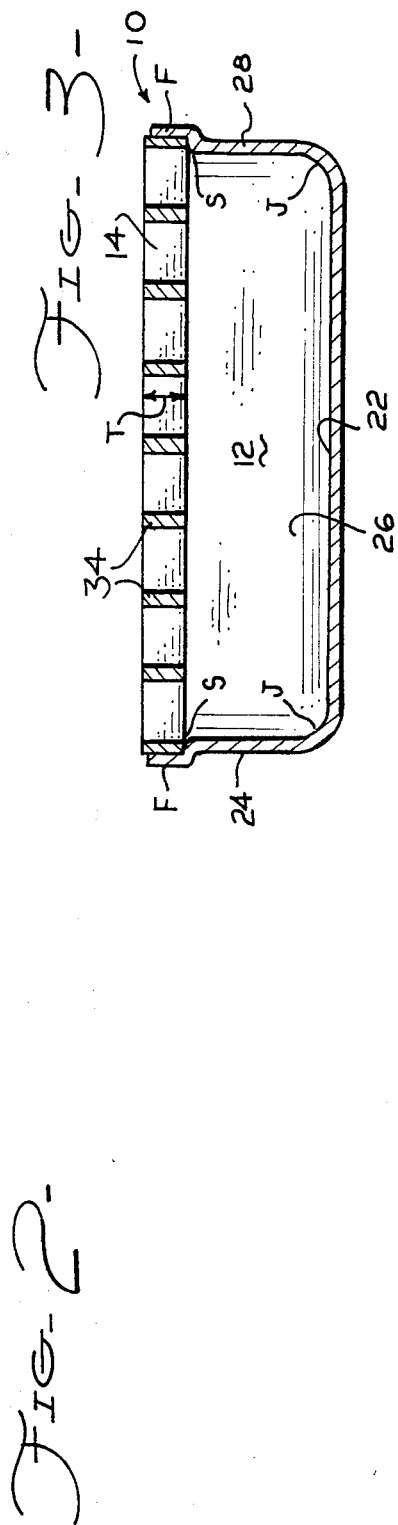

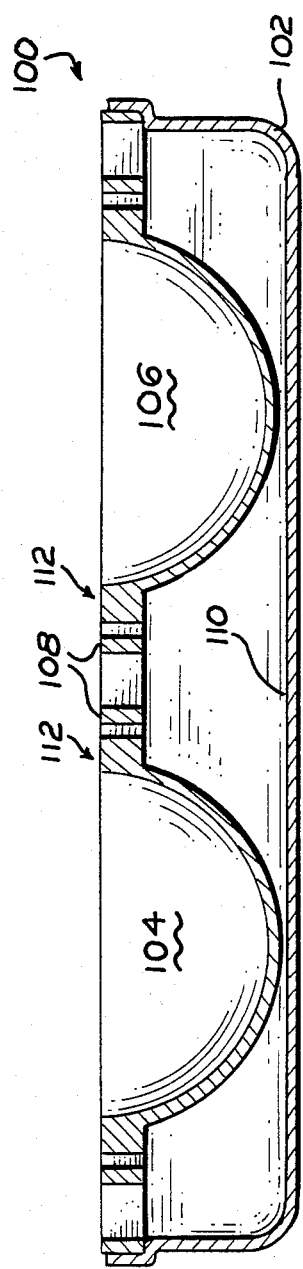
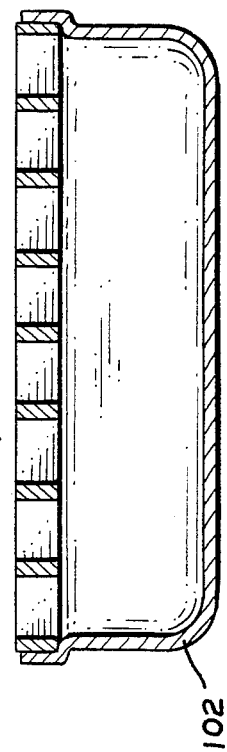

4,532,891

PET FEEDER ASSEMBLY

CROSS-REFERENCES TO RELATED APPLICATIONS

This application is a continuation-in-part of co-pending application No. 538,164, filed 10/03/83 entitled Pet Feeder Assembly, now abandoned.

BACKGROUND OF THE INVENTION

1. Field of the Invention

This invention relates generally to animal feeders and more particularly to animal feeders which collect spilled materials.

2. Description of the Prior Art

Pet owners are very familiar with the mess that a household pet can make while feeding. Typically, a dog or a cat is provided with two feeding bowls, one of which contains water and the other one of which contains the animal's food. When the feeding bowls are placed on the floor there is a tendency for the pet, in its enthusiasm, to slop some of the contents of the bowls onto the surrounding floor areas.

This tendency for a pet to slop food and water from its bowls can, to a degree, be minimized by anchoring the bowls to a feeding stand. For example, U.S. Pat. No. 2,555,396 of Cosner, U.S. Pat. No. 2,841,114 of Grant, and U.S. Pat. No. 2,845,896 of Copeland all teach pet bowl feeding stands including a solid, impermeable surface provided with circular holes receptive to a number of feeding bowls. The rims of the bowl are substantially flush with the impermeable surface, so any food or water pushed from the bowls would tend to accumulate on the surface and eventually on the floor surface surrounding the feeding stations.

In U.S. Pat. No. 1,803,413 of Trites, U.S. Pat. No. 1,114,264 of Hoyle, U.S. Pat. No. 2,586,979 of Myers, and U.S. Pat. No. 1,874,141 of Sueper, poultry drinking stands are described including a receptacle, a fine-mesh grid placed over the the receptacle, and a bowl of water placed on top of the mesh. Any water which may slop over the sides of the bowl flow through the fine-mesh grid and into the receptacle for storage and subsequent disposal.

While the devices described in the preceding paragraph are well adapted for the watering of poultry, they would not be very useful for household pets. Firstly, the water bowls are not attached to the grid surface but rather are free to slide over it, and would undoubtedly be pushed to the floor by a household pet. Secondly, the interstices of the grids are too small to pass particulate matter which might be dislodged from the pet's food bowl. For example, the interstices of a grid would need to be at least ⅛" across to allow pieces of dog kibble to pass through.

Thus, what the prior art fails to address is a pet feeder assembly which collects both liquid and particulate matter that has been slopped from a pet's feeding bowls, and which further immobilizes the feeding bowls to a stand.

SUMMARY OF THE INVENTION

An object of this invention is to provide a pet feeder assembly which minimizes the mess associated with feeding a household pet.

Another object of this invention is to provide a pet feeder assembly which collects particulate and liquid matter which has been slopped from a pet's feeding bowl for subsequent sanitary disposal.

A still further object of this invention is to provide a pet feeder assembly which immobilizes the feeding bowls to a stand.

A still further object of this invention is to provide a pet feeder assembly which is simple in design, inexpensive to produce, and rugged and long lasting in use.

Briefly, the invention comprises an open, substantially rectangular, flat bottomed pan; a flat, rectangular lattice member horizontally supported by the upwardly rising sidewalls of the pan; and a pair of feeding bowls engaged with circular apertures provided in the lattice member. The lattice member supports the feeding bowls such that their upper rims are substantially flush with the upper surface of the lattice member and such that their bottom portions are supported above the bottom of the pan. The lattice member is formed from a number of crossing bar members which define interstices large enough to pass particulate matter pushed from the pet's food bowl. An alternate embodiment of this invention has the lattice member and the bowls made as one integral member.

A major advantage of this invention is that a household pet can be fed without the usual accompanying mess.

These and other objects and advantages of the present invention will no doubt become apparent upon a reading of the following descriptions and a study of the several figures of the drawing.

BRIEF DESCRIPTION OF THE DRAWING

FIG. 2 is a cross-sectional view taken along line 2—2 of FIG. 1.

FIG. 3 is a cross-sectional view taken along line 3—3 of FIG. 1.

FIG. 1A is a top plan view of an alternate embodiment of the present invention.

FIG. 2A is a cross-sectional view taken along line 2A—2A of FIG. 1A.

FIG. 3A is a cross-sectional view taken along line 3A—3A of FIG. 1A.

DETAILED DESCRIPTION OF THE PREFERRED EMBODIMENT(S)

Figure 1:
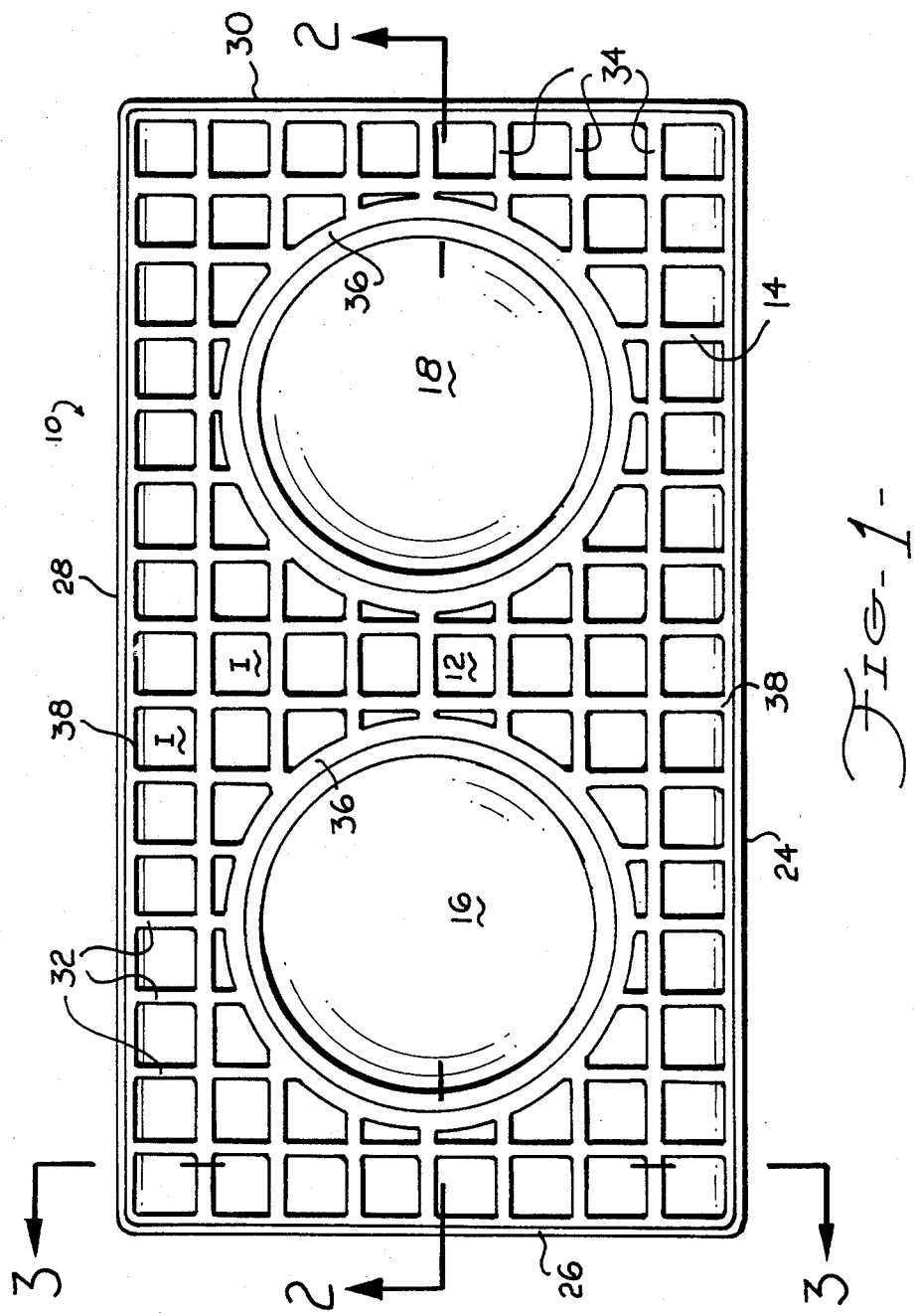
FIG. 1 is a top plan view of a pet feeder assembly in accordance with the present invention.

Referring generally to the FIGS. 1–3, a pet feeder assembly 10 in accordance with the present invention includes a receptacle in the shape of a generally rectangular pan 12; a grid or lattice member 14; and a pair of feeding bowls 16 and 18. The feeding bowls 16/18 are engaged with enlarged holes or apertures 20 provided in lattice member 14.

Pan 12 includes a substantially flat base portion 22, and four contiguous, upwardly rising sidewall portions 24, 26, 28, and 30. The junctures J between the base 22 and the sidewall portions 24–30 are smoothly rounded to eliminate corners where particulate matter might accumulate. The upper edges of sidewall portions 24–30 are flared at F to provide a shoulder S upon which lattice member 14 can be supported. Pan 12 can be made from any suitable material such as plastic, stainless steel, or aluminum.

Lattice member 14 is a flat, elongated, rectangular member having a first plurality of parallel bar members 32, and a second plurality of bar members 34 intersecting the first plurality of bar members at substantially right angles. The interstices I of lattice member 14 are designed to be large enough to allow particulate matter to fall through the lattice member 14 and into pan 12. The interstices I should be at least ⅜" across, but are preferably ¾" to 1" across. This allows large sized particulate matter from feeding bowls 16/18 to easily pass through the interstices of the lattice.

Apertures 20 are considerably larger than interstices I and lattice member 14, and have a diameter which is slightly larger than the maximum diameter of bowls 16/18 but less than their rim diameter. Preferably, apertures 20 are provided with a ring surface 36 which surround aperture 20 and which provides continuous circumferential engagement with the rim of bowls 16/18. Likewise, lattice member 14 preferably also includes a peripheral surface 38 which connects the end portions of bar members 32/34 together and which provides continuous engagement with shoulder S of pan 12. Of course, ring surfaces 36 and peripheral surface 38 are optional to this invention as they are provided primarily for aesthetic and safety reasons.

Again, pan 12 can be made from any suitable material, but is preferably made from an plastic material. The thickness T of lattice member 14 should be fairly large (such as at least ½") to provide sufficient strength and rigidity to the lattice member.

Bowls 16 and 18 are fairly standard in design and include a hemispherical portion 40 and a rim portion 42. It is the rim portion 42 which contacts the ring surface 36 of the lattice member. The bowls 16/18 are preferably made from stainless steel, plastic, plated steel, or glass.

In use, pan 12 is placed on a floor surface and lattice member 14 is engaged with shoulder S of the pan. Bowls 16/18 are then filled with food and/or water and engaged with apertures 20 of lattice member 14. The rims 42 of bowls 16/18 are substantially flush with the upper surface of lattice member 14, and the bottom of bowls 16/18 are supported slightly above base 22 of pan 12.

When the pet eats or drinks from bowls 16 and/or 18, any liquid or particulate matter slopped from the bowls will flow or fall through the interstices I of lattice member 14 and into pan 12. After feeding, the bowls 16/18 and the lattice 14 can be removed from pan 12 so that they may be cleaned.

An alternate embodiment pet feeder assembly 100 of the present invention is illustrated in FIGS. 1a–3a. The alternate embodiment also includes a slop collecting pan 102 of substantially the same construction as pan 12 of the previous embodiment. The bowl portions 104 and 106 of assembly 100, however, are formed integrally with a lattice portion 108. As in the previous embodiment, the bowls 104 and 106 are suspended above the bottom surface 110 of pan 102 so that they do not interfere with any liquid or particulate matter that may have collected on that surface.

Since bowl portions 104 and 106 are formed integrally with lattice portion 10, the bowls and lattice portion can be conveniently be made by mass production techniques such as injection molding. It should also be noted that by making the lattice portion and bowl portions as a one piece unit, the upper rims can be made flush with the upper surface of lattice member 108 to provide a completely flat upper surface to assembly 100, which makes them easier to stack and transport. Furthermore, the entire assembly 100 becomes more stable since there is no way to tip over a bowl portion without physically tipping over the entire collection pan 102.

While this invention has been described in terms of a few preferred embodiments, it is contemplated that persons reading the preceding descriptions and studying the drawing will realize various alterations, permutations and modifications thereof. For example, with minor modifications the present apparatus could be used as a feeding tray for infants which may or may not be attachable to a high chair.

It is therefore intended that the following appended claims be interpreted as including all such alterations, permutations and modifications as fall within the true spirit and scope of the present invention.

What is claimed is:

1. A pet feeder assembly comprising:
an upwardly opening receptacle for receiving and retaining liquid and solid matter, said receptacle including a base portion and contiguous sidewall portions rising from said base portion, said sidewall portions being provided with shoulder means proximate an upper edge thereof; and
feeder means including
a rigid, self-supporting, frameless, substantially planar lattice portion engaged with said shoulder means of said sidewall portions so as to be supported over and substantially parallel to said base portion and said receptacle, said lattice portion having a plurality of crossing bar members attached together at their junctures and having interstitial spaces large enough to pass particulate matter at least ⅜ inch across; and
a bowl portion supported by and extending downwardly from said lattice portion, said bowl portion having a rim surface which is substantially even with said lattice portion, and a bottom surface which is located a small distance above said base portion of said receptacle relative the depth of said bowl portion.

2. A pet feeder as recited in claim 1 wherein said receptacle is provided with a flared rim section receptive to the edges of said lattice portion, where said shoulder means is formed at the base of said flared rim section.

3. A pet feeder as recited in claim 1 wherein said lattice portion is provided with an aperture, and wherein said bowl portion is removably engagable with said aperture, said aperture being surrounded by a contiguous surface which may engage substantially the entirety of said rim surface of said bowl portion.

4. A pet feeder as recited in claim 3 wherein said bowl portion is a first bowl portion, said aperture in said lattice portion is a first aperture, and said lattice portion is provided with a second aperture, and further comprising a second bowl portion removably engagable with said second aperture, said second aperture being surrounded by a contiguous surface which may engage substantially the entirety of a rim surface of said second bowl portion.

5. A pet feeder as recited in claim 1 wherein said lattice portion and said bowl portion are formed as a single, integral unit.

6. A pet feeder as recited in claim 5 wherin said bowl portion is a first bowl portion, and further comprising a second bowl portion formed as a single, integral unit with said lattice portion.

* * * * *